United States Patent
Hearing et al.

(10) Patent No.: US 9,950,833 B2
(45) Date of Patent: Apr. 24, 2018

(54) FLEXIBLE CONFIGURATION SYSTEM, METHODS, EQUIPMENT, AND AIRCRAFT

(75) Inventors: John D. Hearing, Maple Valley, WA (US); Edward A. Froese, Tacoma, WA (US); Charlotte R. Lin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 364 days.

(21) Appl. No.: 11/609,644

(22) Filed: Dec. 12, 2006

(65) Prior Publication Data

US 2008/0135681 A1   Jun. 12, 2008

(51) Int. Cl.
*B65D 19/38* (2006.01)
*B64D 9/00* (2006.01)

(52) U.S. Cl.
CPC ............... *B65D 19/38* (2013.01); *B64D 9/00* (2013.01); *B65D 2519/00333* (2013.01)

(58) Field of Classification Search
CPC . B65D 19/38; B65D 2519/00333; B64D 9/00
USPC ............... 361/826–828, 832, 796, 797, 800, 361/724–727; 174/52.1, 52.6, 65; 244/118.5; 108/23, 50.11, 50.02, 44
See application file for complete search history.

(56) References Cited

U.S. PATENT DOCUMENTS

| | | | | | |
|---|---|---|---|---|---|
| 4,835,604 | A | * | 5/1989 | Kondo | H04N 7/10 348/836 |
| 4,853,555 | A | * | 8/1989 | Wheat | 307/9.1 |
| 5,984,415 | A | * | 11/1999 | Schumacher et al. | 297/411.2 |
| 6,038,426 | A | * | 3/2000 | Williams, Jr. | 725/77 |
| 6,056,239 | A | * | 5/2000 | Cantu et al. | 244/118.6 |
| 6,808,413 | B2 | * | 10/2004 | Plant et al. | 439/527 |
| 6,899,390 | B2 | * | 5/2005 | Sanfrod et al. | 297/217.4 |
| 6,929,218 | B1 | * | 8/2005 | Sanford | B64D 11/0015 244/118.5 |
| 7,063,562 | B2 | * | 6/2006 | Henley et al. | 439/502 |
| 2005/0021602 | A1 | * | 1/2005 | Noel et al. | 709/203 |
| 2006/0038070 | A1 | * | 2/2006 | Henley et al. | 244/118.6 |

* cited by examiner

*Primary Examiner* — Valentina Xavier
(74) *Attorney, Agent, or Firm* — Toler Law Group, PC

(57) ABSTRACT

A flexible configuration system, method equipment and aircraft are disclosed. This system may use a pallet that includes a load bearing member; and a pallet data network system carried by the load bearing member. The data network system includes at least one external data connection configured to connect the pallet data network to an external network; and at least one pallet data connection configured to connect the pallet data network to devices, equipment, workstations, or seats carried by the pallet.

22 Claims, 5 Drawing Sheets

FLEXIBLE CONFIGURATION SYSTEM, METHODS, EQUIPMENT, AND AIRCRAFT

BACKGROUND OF THE INVENTION

Field of the Invention

The invention relates to methods, equipment and systems used to reconfigure or repurpose aircraft and, more particularly, to methods, equipment and systems used to quickly reconfigure or repurpose an aircraft without an extended out of service period.

Description of the Related Art

Reconfiguration of commercial or military aircraft is challenging, particularly when installation of new equipment, capabilities, or changes in mission is required. Military aircraft may need to be reconfigured when the needs of intelligence, surveillance, or command and control missions change. Civilian aircraft may require reconfiguration to account for changing passenger demographics, fare classifications, or seating arrangements.

Current military configurations involve bolted-down racks of equipment, secured workstations, dedicated wiring bundles, etc. Making changes to these often require substantial levels of effort, including designing new racks, rewiring systems, upgrading cooling, cutting new holes in aircraft, and reshuffling equipment in order to maintain weight and balance.

Military aircraft reconfiguration has other impacts as well. When new capabilities are needed, many times they are developed in systems labs, then the aircraft must be taken out of service, the upgrades installed, and then substantial testing must take place.

Rapid changeover of mission systems has been a goal for years, especially concepts for rolling mission systems on or off aircraft, but reality has been harder to achieve, as most wiring, cooling, etc has not been set up to accommodate these rapid changes.

Attempts have been made to provide rapid changeover capabilities using cargo containers and/or standard air cargo pallets. These were generally wired inside, but didn't offer any network or power distribution advantages and have generally not been successful due to the weight penalty imposed by using these types of cargo-rated systems.

Current civilian configurations involve bolted down seats, fixed overhead lighting, EC, and emergency equipment, dedicated wiring bundles to connect to the overhead and seat audio/visual systems and EC systems; etc. Making changes to these often require substantial levels of effort, i.e., rewiring systems, upgrading cooling, moving lighting, EC and emergency equipment.

Civilian aircraft reconfiguration has other impacts as well. When a new seat arrangement or audio/video upgrades are needed, the aircraft must be taken out of service for an extended time, the upgrades installed, and then substantial testing must take place. This time period represents lost revenue for the airline.

Rapid reconfiguration of civilian aircraft has been considered impractical for years. Consequently, no real effort has been made to develop modular systems for civilian aircraft.

Accordingly, there is a need for a generic pallet; floor panel system, or method that provides at least network connections on the pallet and can be used for to reconfigure aircraft.

BRIEF SUMMARY OF THE INVENTION

The present invention addresses the problems identified above by providing methods, equipment and systems that enable the reconfiguration of an aircraft.

Methods, aircraft, systems and pallets are disclosed for configuring Intelligence, Surveillance, or Command and Control or similar aircraft with mission systems, workstations, and processing equipment through installing all mission systems, workstations, processors, etc on modular, lightweight "pallets" that can fit on main deck or in cargo bays of aircraft; network, electrical power, and environmental conditioning (EC) provisions integrated into the pallets; a related distributed system of network, electrical power, and environmental conditioning, equipped with standardized connection mechanisms at multiple locations, accessible from main deck and/or cargo bay of aircraft.

Aircraft mission systems are disclosed that can be rapidly reconfigured, replaced, and recapitalized. Thus, allowing systems to be rapidly installed after lab checkout, reducing "downtime" for aircraft being upgraded. It also enables flexible configurations for specific missions—ability to add workstations or processors, or shift to different locations, depending on weight, balance, or range requirements; ability to offload systems that aren't in use, thereby extending aircraft range by not requiring them to carry unnecessary weight.

One embodiment of the invention may provide a significant improvement in techniques for configuring Intelligence, Surveillance, Reconnaissance, Command and Control or similar aircraft with mission systems, workstations, and processing equipment. Another embodiment of the invention utilizes "palletized" standardized, distributed system for equipping aircraft with mission systems.

One embodiment includes a smart pallet formed from a load bearing member; and a pallet data network system carried by the load bearing member. The data network system includes at least one external data connection configured to connect the pallet data network to an external network; and at least one pallet data connection configured to connect the pallet data network to devices, equipment, workstations, or seats carried by the pallet.

Another embodiment includes an airplane having an airframe; an airplane network carried by the airframe, the airplane network having a plurality of predetermined connection points; and at least one pallet removably carried by the airframe. The pallet includes a first load bearing member; and a pallet data network system carried by the load bearing member. The data network system includes at least one external data connection that connects the pallet data network to the airplane network; and at least one pallet data connection configured to connect the pallet data network to devices, equipment, workstations, or seats carried by the pallet.

BRIEF DESCRIPTION OF THE DRAWINGS

The accompanying drawings incorporated in and forming part of the specification illustrate several aspects of the present invention. In the drawings.

Reference will now be made in detail to embodiments of the invention, examples of which are illustrated in the accompanying drawings.

DETAILED DESCRIPTION

Figure 1:
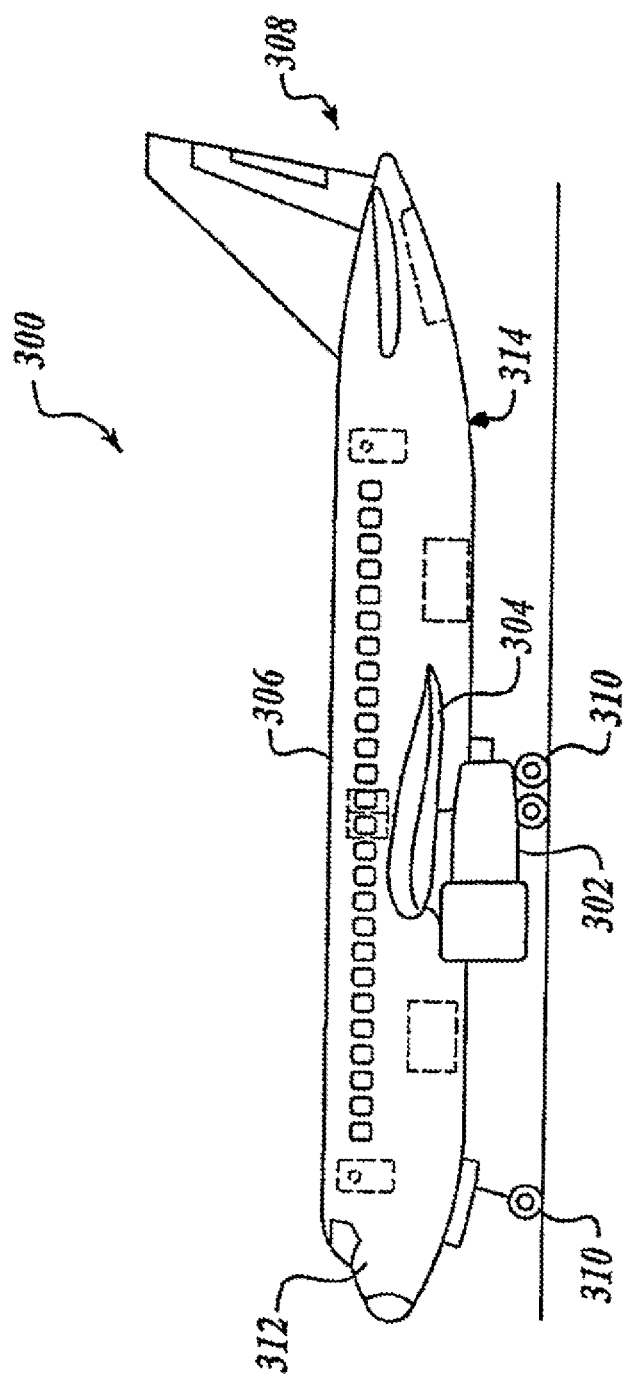
FIG. 1 illustrates an a side view of an aircraft that may include one embodiment of the invention.

Those skilled in the art will also readily recognize that the following embodiments may be incorporated into a wide variety of different systems. Referring now in particular to FIG. 1, a side elevation view of an aircraft 300 having one or more of the disclosed embodiments of the present invention is shown. With the exception of the embodiments according to the present invention, the aircraft 300 includes components and subsystems generally known in the pertinent art, and in the interest of brevity, will not be described further. The aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. In some embodiments the fuselage 306, tail assembly 308 and nose assembly 312 may form an airframe 314. In other embodiments the airframe may also include wings 304.

The aircraft 300 further includes other systems and subsystems generally required for the proper operation of the aircraft 300. For example, the aircraft 300 includes a flight control system (not shown in FIG. 1), as well as a plurality of other network, electrical, EC, mechanical and electromechanical systems that cooperatively perform a variety of tasks necessary for the operation of the aircraft 300. Accordingly, the aircraft 300 is generally representative of a commercial passenger aircraft, which may include, for example, the 737, 747, 757, 767 and 777 commercial passenger aircraft available from The Boeing Company of Chicago, Ill. Although the aircraft 300 shown in FIG. 1 generally shows a commercial passenger aircraft, it is understood that the various embodiments of the present invention may also be incorporated into flight vehicles of other types. Examples of such flight vehicles may include manned or even unmanned military aircraft, rotary wing aircraft, ballistic flight vehicles or orbital vehicles, as illustrated more fully in various descriptive volumes, such as Jane's All The World's Aircraft, available from Jane's Information Group, Ltd. of Coulsdon, Surrey, UK. Additionally, those skilled in the art will readily recognize that the various embodiments of the present invention may also be incorporated into terrestrial or even marine vehicles.

Figure 2:
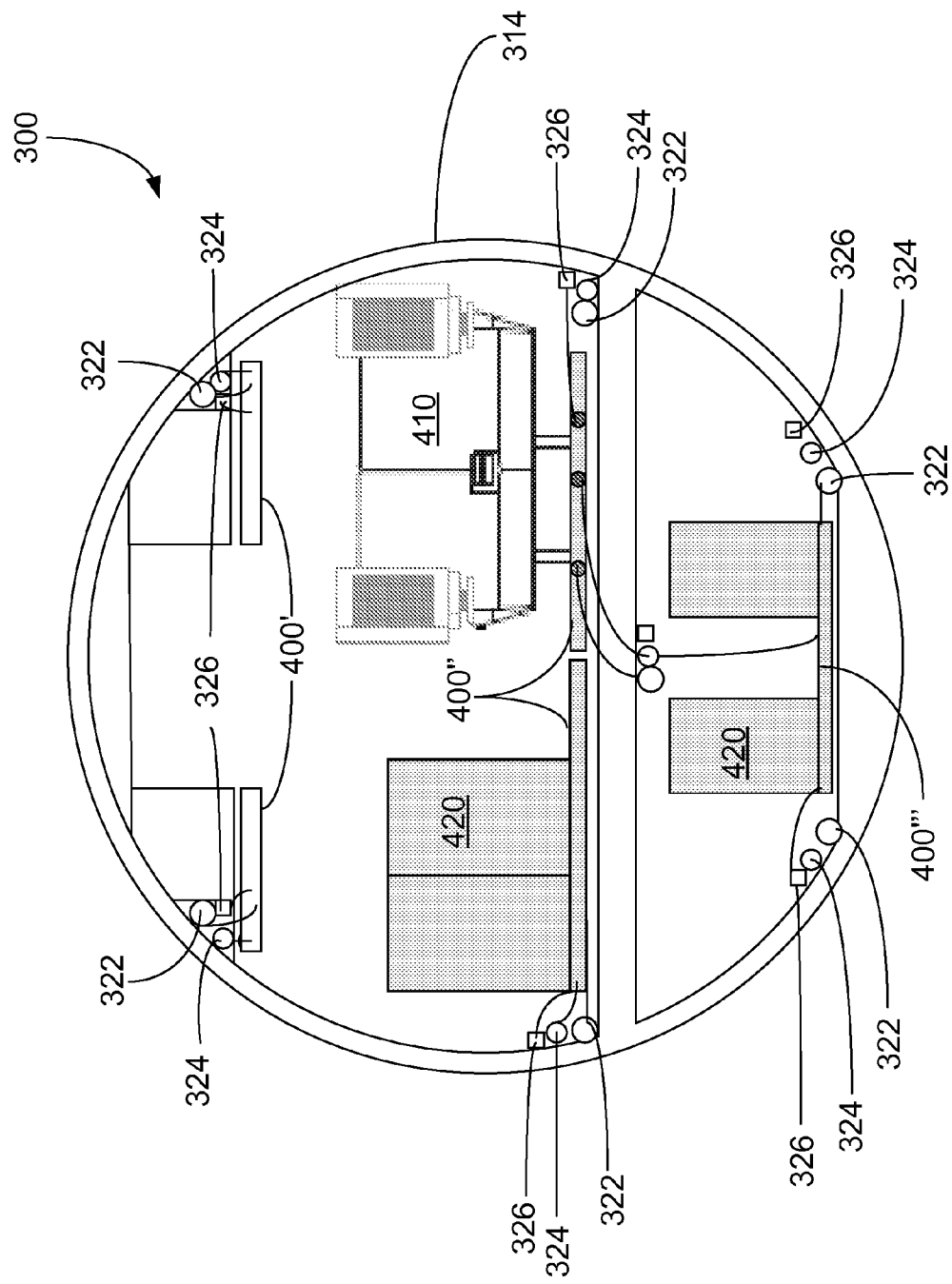
FIG. 2 illustrates an exemplary cross-section of the aircraft shown in FIG. 1 and illustrating different embodiments of the invention.

As shown in the exemplary aircraft cross section in FIG. 2, the aircraft 300 may include one or more of the embodiments of the pallet assembly, which may be incorporated into various portions of the aircraft 300.

As shown in FIG. 2, aircraft 300 may include one or more environmental conditioning (EC) systems 322; one or more power systems 324, and one or more network systems 326. The EC system 322 may be any current or future EC system and may include HVAC, liquid heating, and/or liquid cooling systems. Similarly, the power system 324 and network system 326 may be any current or future systems. Typically, power system 324 carries electric power. These systems may be located at different locations depending on the needs of the aircraft 300 builder or owner. For example, the systems may be run together as shown in FIG. 2. In other embodiments the systems may be separated. The systems may be installed in the overhead of the main cabin or the cargo hold. Alternatively, these systems may be installed at or near the floor of the main cabin or the cargo hold.

Each of the EC system 322, power system 324, and network system 326 has connection points at predetermined positions. In one embodiment the connection points are approximately the same distance apart. In other embodiments the distance between connections may vary.

FIG. 2 also shows different embodiments for pallet 400. For example overhead pallet 400' may be removably carried by the airframe 314 in the overhead of the main cabin. In some embodiments the overhead pallet 400' may be removably attached to the overhead bins or the supports for the overhead bins. The overhead pallet 400' may connect to one or more of the EC system 322, power system 324, or network system 326.

Main cabin pallet 400" may be removably carried by the main cabin floor or floor structure. Thus, in some embodiments, the pallet 400" could replace the conventional floor plates or deck and be removable attached to the main cabin floor beams or floor structure. The main cabin pallet 400" may connect to one or more of the EC system 322, power system 324, or network system 326.

Similarly, cargo hold pallet 400''' may be removably carried by the cargo hold floor or floor structure. Thus, in some embodiments, the pallet 400''' could replace the conventional floor plates or deck and be removable attached to the cargo hold floor beams or floor structure. The cargo hold pallet 400''' may connect to one or more of the EC system 322, power system 324, or network system 326. In some embodiments the cargo hold pallet 400''' may be the same as the main cabin pallet 400".

The pallet 400 is typically, attached or fastened to the airframe or supporting structure in any manner that will permit the easy removal and replacement of the pallet. For example, pallet 400 may be attached using screws, ¼ turn twist to lock fasteners, etc. Pallet 400 could also be attached to an existing fitting in the aircraft such as longitudinal "seat rails" or cargo attachment systems.

Figure 3:
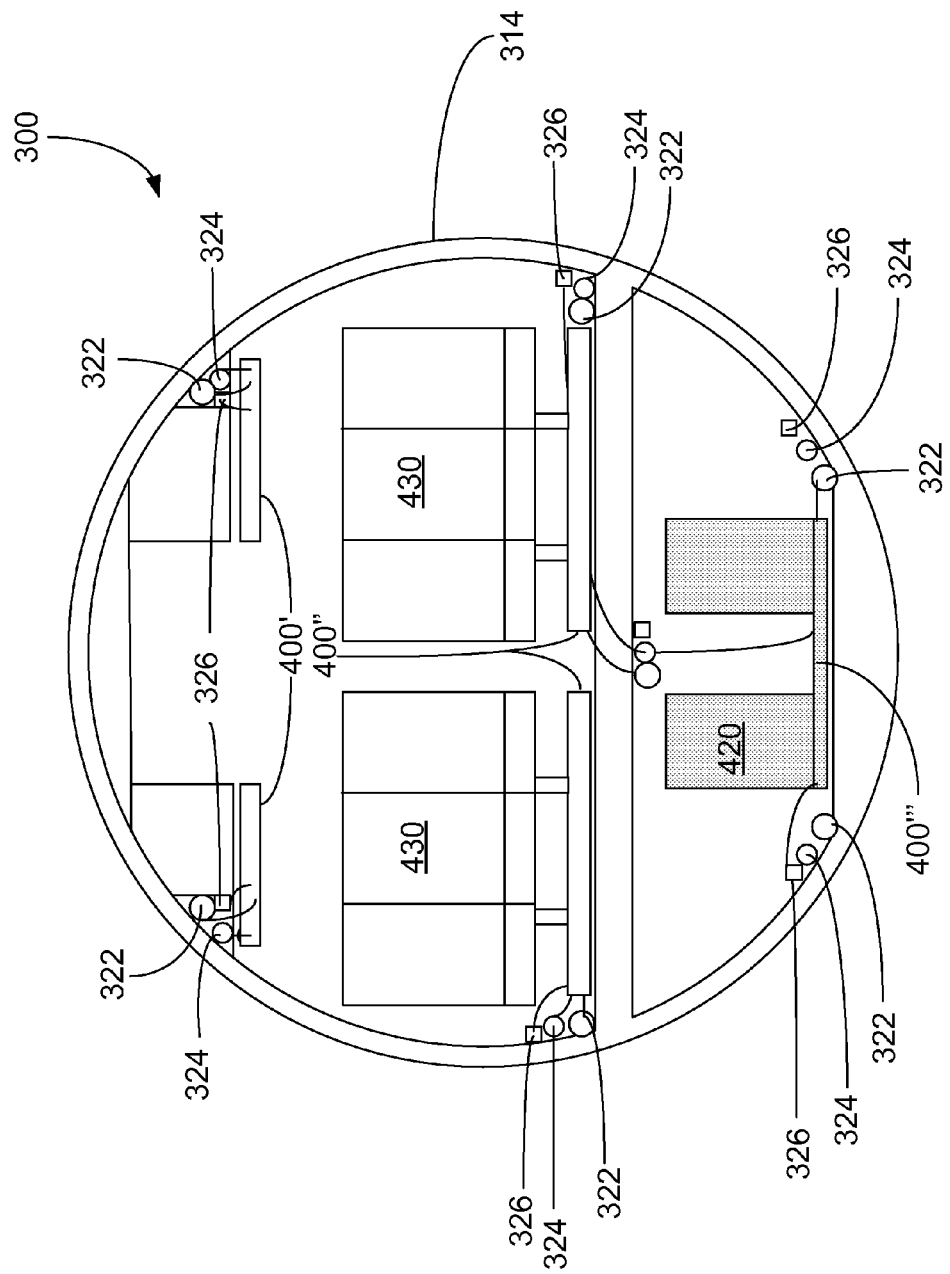
FIG. 3 shows an exemplary cross-section of the aircraft shown in FIG. 1 and illustrating different embodiments of the invention.

FIG. 2 illustrates main cabin pallet 400" carrying a workstation 410 or equipment 420. Cargo hold pallet 400''' is illustrated carrying equipment 420. The illustrated overhead pallet 400' may carry lighting (the lighting connected to a switch), ventilation outlets, speakers, video displays, emergency equipment, etc. A drop down oxygen mask is one example of emergency equipment that may be carried by overhead pallet 400'. FIG. 3 illustrates main cabin pallet 400" carrying passenger seats.

Figure 4:
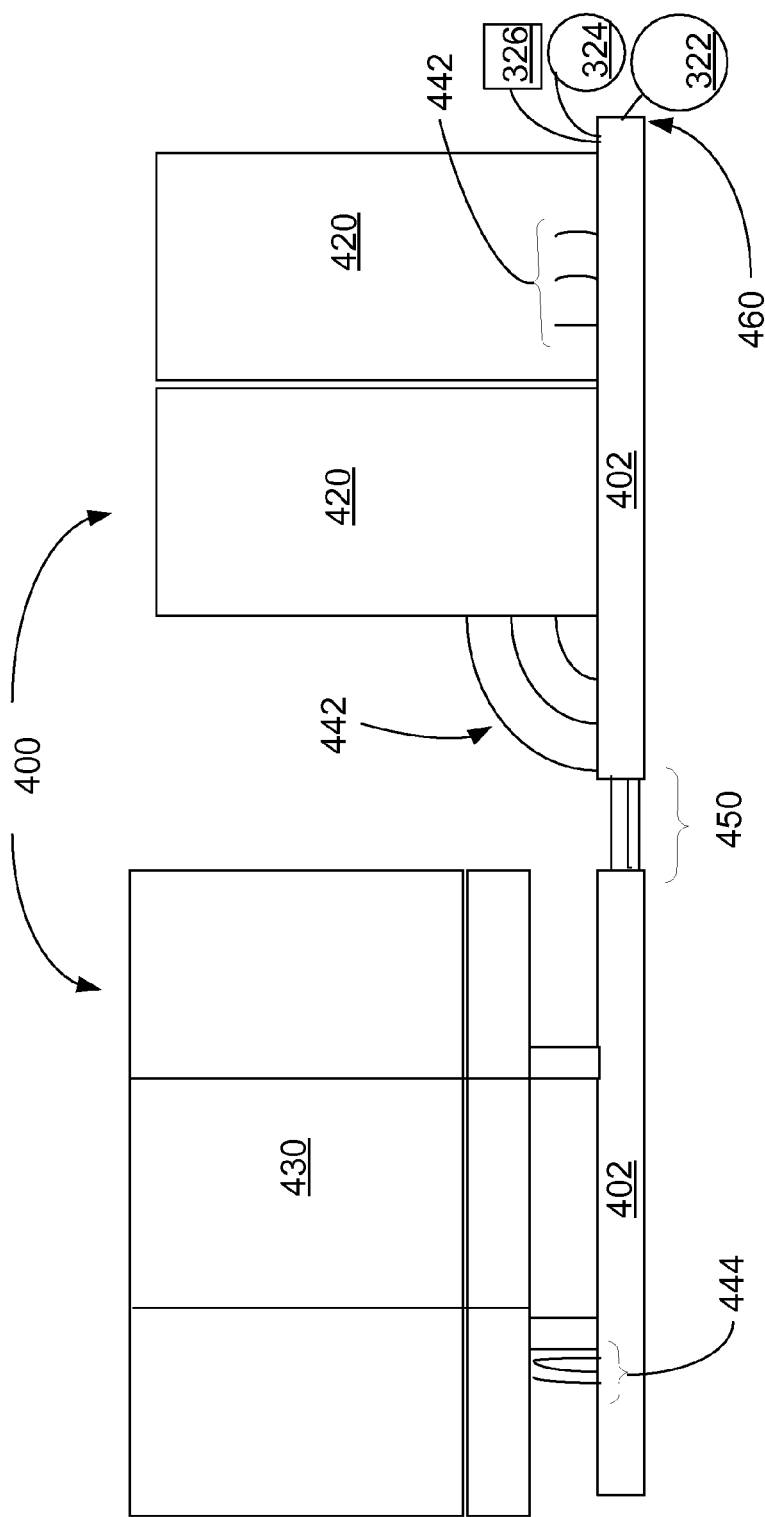
FIG. 4 illustrates additional embodiments of the invention.

FIG. 4 illustrates an embodiment where one pallet 400 carries first and second mission equipment, e.g, equipment 420 and a second pallet 400 carries seats 430. The seats 430 may be connected to the pallet 400 with seat supports. Typically, the seat supports would connect to seat rails on the pallet 400. If desired the seats 430, equipment 420 and/or work station 410 may also be connected to one or more of a pallet EC system, a pallet power system, or a pallet data network. In the embodiment shown in FIG. 4, equipment 420 may be connected to one or more of the pallet EC system, the pallet power system, or the pallet data network with connections 442. Typically the equipment 420 would only connect to the systems on pallet 400 used by equipment 420.

In the embodiment shown in FIG. 4, seats 430 may be connected to one or more of the pallet EC system, the pallet power system, or the pallet data network with connections 444. Typically the seats would only connect to the systems on pallet 400 used by seats 430. In the typical embodiment the seats 430 would receive audio and/or video programming over the pallet network and receive power for the audio and/or video system from the pallet power system. In some embodiments the seats 430 may receive warm or cool air from the pallet EC system. The seats 430 are shown as a group of three seats. In other embodiments the number of seats could be larger or smaller. In some embodiments there may be a single seat on pallet 400.

Pallet 400 may connect to the aircraft EC system 322, the aircraft power system 324, or the aircraft network 326 with connections 460. In some embodiments the pallet 400 may only connect to the systems required to support the seats 430, equipment 420, or workstation 410 carried by the pallet 400. In other embodiments, the pallet may connect to all or a common subset of the systems available so that a pallet 400 may share its connection 460 to the aircraft systems with another pallet 400 using a pallet to pallet connection 450. In some embodiments a dedicated connection may be used. In other embodiments the pallet to pallet connection would connect the pallet to aircraft connection, on the pallet to receive system support, to a pallet to equipment connection on the pallet providing system support. The use of a pallet to pallet connection 450 could reduce the number of aircraft system connections required.

In some embodiments on the pallets 400 may be lightweight pallets made of honeycombed composite materials or other lightweight structures. The pallets may include network, power and EC systems and connections. Additional system connections may also be provided. The pallets may also include mission consoles, mission processing systems, seating, overhead lighting and ventilation and/or combinations of elements.

Each pallet 400 typically has standardized connections and distribution built in for network, power, and EC (e.g. cooling air). The aircraft may be configured to accept these pallets on the main deck and/or in the lower cargo bays interchangeably. In the deck between the upper and lower decks may be conduits that carry electrical power, network cables, and EC such as cooling along the length of the aircraft, accessible from main deck and/or cargo bay of aircraft. Periodic standardized connection points for power, network, and cooling are available at regular intervals along the aircraft, so that pallets can be easily plugged into them.

Figure 5:
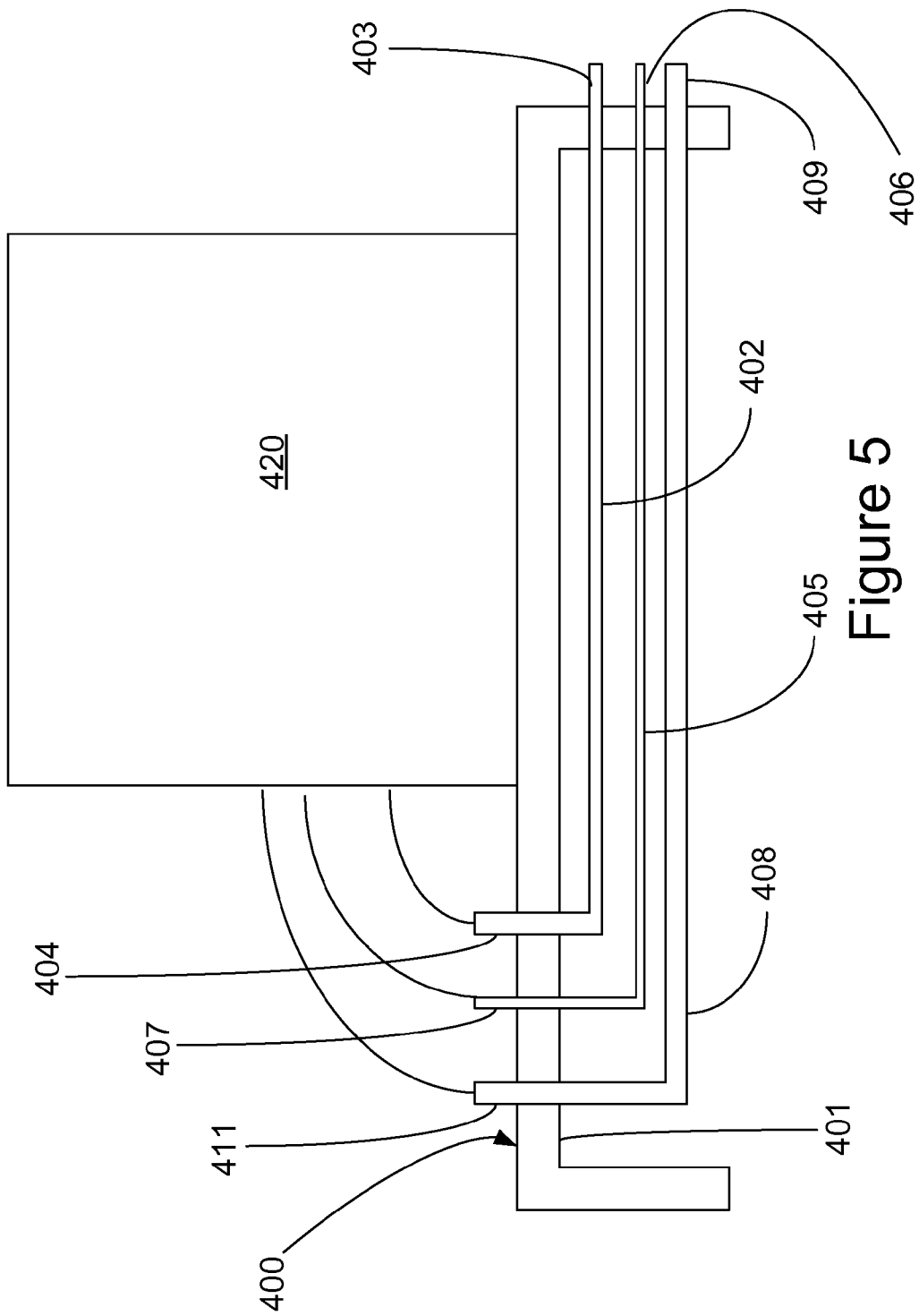
FIG. 5 shows a close-up view of one of the embodiments shown in FIG. 4.

FIG. 5 illustrates one embodiment of pallet 400. In this embodiment, pallet 400 may be formed from a load bearing member 401. Attached to or carried by load bearing member 401 are the pallet systems. In the embodiment shown these systems include pallet EC system 402; pallet power system 405; and pallet network system 408. Other embodiments may have additional systems or may have only one or two of these systems.

The pallet EC system 402 includes at least one pallet-aircraft connection 403 which is configured to connect the pallet EC system 402 to the aircraft EC system 322. The pallet EC system 402 also includes at least one pallet-equipment connection 404 which is configured to connect the pallet EC system 402 to the equipment, workstation, seat, etc. carried by the pallet.

The pallet power system 405 includes at least one pallet-aircraft connection 406 which is configured to connect the pallet power system 405 to the aircraft power system 324. The pallet power system 405 also includes at least one pallet-equipment connection 407 which is configured to connect the pallet power system 405 to the equipment, workstation, seat, etc. carried by the pallet.

The pallet network system 408 includes at least one pallet-aircraft connection 409 which is configured to connect the pallet network system 408 to the aircraft network system 326. The pallet network system 408 also includes at least one pallet-equipment connection 411 which is configured to connect the pallet network system 408 to the equipment, workstation, seat, etc. carried by the pallet.

The pallet-aircraft connections and the pallet-equipment connections may use any suitable connector.

In summary, numerous benefits are described which result from employing the concepts of the invention. The foregoing description of an exemplary preferred embodiment of the invention is presented for the purposes of illustration and description. It is not intended to be exhaustive or to limit the invention to the precise form disclosed. Obvious modifications or variations are possible in light of the above teachings. The embodiment was selected and described in order to best illustrate the principles of the invention and its practical application to thereby enable one of ordinary skill in the art to best utilize the invention in various embodiments and with various modifications as are suited to particular uses contemplated. It is intended that the scope of the invention be defined by the claims appended hereto.

We claim:

1. A system comprising:
a pallet removably attachable to a structure of an aircraft and configured to couple to mission equipment,
wherein the pallet includes:
   a pallet-aircraft network connector configured to couple the mission equipment to a data network of the aircraft;
   a pallet-aircraft environmental conditioning connector configured to couple the pallet to an environmental conditioning system of the aircraft;
   a pallet-equipment environmental conditioning connector configured to couple the mission equipment to the environmental conditioning system of the aircraft via the pallet;
   a pallet to pallet network connector configured to couple another pallet to the data network of the aircraft via the pallet; and
   a pallet to pallet environmental conditioning connector configured to couple the another pallet to the environmental conditioning system of the aircraft via the pallet.

2. The system of claim 1, wherein the pallet further includes a pallet-aircraft power connector configured to couple the mission equipment to a power system of the aircraft.

3. The system of claim 2, wherein the mission equipment includes a workstation, wherein the workstation is electrically coupled to the pallet-aircraft power connector, and wherein the workstation is communicatively coupled to the pallet-aircraft network connector.

4. The system of claim 2, wherein the mission equipment includes:
a seat; and
an audio system coupled to the seat, wherein the audio system is electrically coupled to the pallet-aircraft power connector, wherein the audio system is communicatively coupled to the pallet-aircraft network connector, and wherein the audio system is configured to receive audio content via the pallet-aircraft network connection from the data network.

5. The system of claim 2, wherein the mission equipment includes at least one light electrically connected to a switch, and wherein the switch is connected to the power system via the pallet-aircraft power connector.

6. The of claim 1, wherein the structure is a cargo hold floor beam of the aircraft.

7. The system of claim 1, wherein the structure is a seat rail of a main cabin of the aircraft.

8. The system of claim 1, wherein the structure is an overhead bin of the aircraft.

9. A system comprising:
a first pallet removably attachable to a structure of an aircraft,
wherein the first pallet is configured to couple to first mission equipment and includes:
a pallet-aircraft network connector configured to couple the first mission equipment to a data network of the aircraft;
a pallet-aircraft environmental conditioning connector configured to couple the first mission equipment to an environmental conditioning system of the aircraft; and
a pallet-equipment environmental conditioning connector configured to couple the first mission equipment to the environmental conditioning system of the aircraft via the first pallet; and
a second pallet removably attachable to the structure of an aircraft, wherein the second pallet is configured to couple to second mission equipment and includes:
a pallet to pallet network connector configured to couple the second mission equipment to the data network of the aircraft via the first pallet;
a pallet to pallet environmental conditioning connector configured to couple the second mission equipment to the environmental conditioning system of the aircraft via the first pallet; and
a pallet-equipment environmental conditioning connector configured to couple the second mission equipment to the environmental conditioning system of the aircraft via the second pallet.

10. The system of claim 9, wherein the first pallet further includes a pallet-aircraft power connector, and wherein the pallet-aircraft power connector is configured to couple the first mission equipment to a power system of the aircraft.

11. The system of claim 10, wherein the second pallet further includes a pallet to pallet power connector, and wherein the pallet to pallet power connector is configured to couple the second mission equipment to the power system of the aircraft via the first pallet.

12. The system of claim 11, wherein the first mission equipment includes a workstation, wherein the workstation is electrically coupled to the pallet-aircraft power connector, and wherein the workstation is communicatively coupled to the pallet-aircraft network connector.

13. The system of claim 12, wherein the second mission equipment includes:
a seat; and
an audio system coupled to the seat, wherein the audio system is electrically coupled to the pallet to pallet power connector, wherein the audio system is communicatively coupled to the pallet to pallet network connector, and wherein the audio system is configured to receive audio content via the pallet-aircraft network connector from the data network.

14. The system of claim 13, wherein the seat is configured to receive airflow via the pallet to pallet environmental conditioning connector.

15. The system of claim 13, wherein the second mission equipment includes a video system coupled to the seat, wherein the video system is electrically coupled to the pallet to pallet power connector, wherein the video system is communicatively coupled to the pallet to pallet network connector, and wherein the video system is configured to receive video content via the pallet-aircraft network connector from the data network.

16. The system of claim 1, wherein the mission equipment includes a drop down oxygen mask.

17. The system of claim 1, wherein the pallet-aircraft environmental conditioning connector is configured to receive a heating liquid from the environmental conditioning system.

18. The system of claim 1, wherein the pallet-aircraft environmental conditioning connection is configured to receive a cooling liquid from the environmental conditioning system.

19. The system of claim 1, wherein the pallet is configured to be removably attachable to the structure via a cargo attachment system.

20. The system of claim 1, wherein the mission equipment includes a vent nozzle coupled to the pallet-aircraft environmental conditioning connector.

21. The system of claim 4, wherein the mission equipment includes a video system coupled to the seat, wherein the video system is electrically coupled to the pallet-aircraft power connector, wherein the video system is communicatively coupled to the pallet-aircraft network connector, and wherein the video system is configured to receive video content via the pallet-aircraft network connector.

22. The system of claim 19, wherein the cargo attachment system is a quarter turn twist-to-lock fastener.

* * * * *

UNITED STATES PATENT AND TRADEMARK OFFICE
CERTIFICATE OF CORRECTION

PATENT NO.        : 9,950,833 B2
APPLICATION NO.   : 11/609644
DATED             : April 24, 2018
INVENTOR(S)       : John D. Hearing, Edward A. Froese and Charlotte R. Lin It is certified that error appears in the above-identified patent and that said Letters Patent is hereby corrected as shown below:

In the Claims

Column 6, Claim 6, Line 64, "The of claim 1" should read --The system of claim 1--.

Signed and Sealed this
Thirteenth Day of November, 2018

Andrei Iancu
*Director of the United States Patent and Trademark Office*